3,222,321
      MODIFIED ACRYLAMIDE INTERPOLYMERS
        CONTAINING INTERPOLYMERIZED UN-
        SATURATED EPOXY RESINS
Kazys Sekmakas, Chicago, Ill., assignor to De Soto Chemical Coatings, Inc., Chicago, Ill., a corporation of Delaware
       No Drawing. Filed Aug. 16, 1962, Ser. No. 217,263
                  7 Claims. (Cl. 260—72)

The present invention relates to aldehyde-modified acrylamide interpolymers containing interpolymerized unsaturated epoxy resins providing heat-curing products which cure to form hard, flexible, solvent resistant coatings exhibiting high gloss and adhesion to the underlying substrate. The new copolymers or interpolymers in accordance with the invention are especially useful in organic solvent solution coating compositions.

Etherified alkylolated acrylamide-containing interpolymers have previously been used in organic solvent solution coating compositions. Unfortunately, when the interpolymer is the sole film-forming component of the coating, it has not been possible to obtain a fully satisfactory combination of properties. Among the difficulties experienced is inadequate adhesion to the substrate which is coated, e.g., a metal substrate. To overcome this difficulty, the art has employed cold blends with epoxy resins, but this is not entirely satisfactory. A further difficulty is unduly limited compatibility with alkyd resins, vinyl resins and aminoplast resins, e.g., solvent-soluble heat-hardening condensation products of urea or melamine with excess formaldehyde.

In accordance with the invention, an acrylamide is copolymerized with other polymerizable ethylenically unsaturated materials, preferably including monomers containing the $CH_2=C<$ group, and an unsaturated epoxy resin to produce a non-gelled solvent-soluble copolymer or interpolymer. At least a portion of the amido hydrogen atoms in the interpolymer are replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical. Preferably, R is hydrogen and, to the extent that etherification is desired or permitted, the etherifying alcohol provides an ether group in which $R_1$ is an alkyl radical containing from 3-8 carbon atoms.

As will be more fully appreciated hereinafter, considerable variation is permissible in the kind and ratio of ethylenically unsaturated materials which are used, the aldehyde modifying agent, the etherifying agent and the extent of etherification. Moreover, there is also a considerable variation which can be made in the specific nature of the unsaturated epoxy resin.

While it is preferred to employ acrylamide in proportions of from 5 to 45%, preferably from 5 to 30% by weight, with unsaturated monomers containing the $CH_2=C<$ group, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used. While the preferred unsaturated monomers interpolymerized with acrylamide do contain the $CH_2=C<$ group and it is preferred to use combinations of the monomers which form hard polymers such as styrene, vinyl toluene and methacrylate, and monomers which form soft polymers such as monoethylenically unsaturated carboxylic acid esters having a terminal aliphatic hydrocarbon group containing from 2-20 carbon atoms, illustrated by ethyl acrylate, butyl acrylate, 2-ethylhexyl acrylate, and stearyl acrylate, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrated castor oil fatty acids which are useful in the production of interpolymers with acrylamide. Still other monomers which may be used are acrylic acid, methacrylic acid, 1,3-butadiene, vinyl ethers such as n-butyl vinyl ether, glycidyl methacrylate, etc.

Non-monomeric ethylenically unsaturated materials may also be used as is illustrated in my copending application Serial No. 115,330, filed June 7, 1961, now United States Patent No. 3,163,615, the disclosure of which is hereby incorporated by reference.

Stated briefly, one may incorporate 5% or more of unsaturated polyester resin containing from 0.005 to 0.40 gram mol of ethylenically unsaturated component per 100 grams of polyester, especially polyesters in which the unsaturation in the polyester is substantially confined to side chains in the polyester structure as by the use of a monoethylenically unsaturated monofunctional component such as crotonic acid or allyl alcohol in an amount to provide from 0.03-0.3 gram mol of unsaturated component per 100 grams of polyester.

The unsaturated epoxy resins which are used in accordance with the invention are epoxidized polyolefins containing extensive unsaturation as is produced by the polymerization of a polyunsaturated olefin such as butadiene or isoprene either alone or in admixture or together with minor proportions of monoethylenically unsaturated monomers such as butene-1, ethylene, propylene, styrene, vinyl toluene, etc. The polydiolefin is a liquid polymer and is subjected to epoxidation as with peracetic acid to partially convert the olefinic unsaturation in the polymer to oxirane groups, some of which are internal, e.g., positioned along the essentially linear polymer chain, and others of which are terminal, e.g., positioned at the termination of branches formed by the incorporation of polydiolefin such as butadiene into the polymer chain through one of its double bonds, leaving the other double bond extending away from the polymer chain. The epoxidation process is not carried to completion, leaving substantial unsaturation to permit further addition polymerization. Also, the epoxidation process may provide some hydroxyl functionality.

Preferred unsaturated epoxy resins are liquid at room temperature, have an iodine number of at least 100 and have an epoxide equivalent weight in the range of from 100–300 (number of grams of resin containing 1 gram mole of epoxide). A particularly preferred unsaturated epoxy rein referred to herinafter as unsaturated epoxy resin A is a viscous liquid partially epoxidized polybutadiene having a viscosity of 1800 poises at 25° C., an epoxide equivalent weight of 177, 2.5% by weight of hydroxyl and an iodine number of 185.

The unsaturated epoxy resin in accordance with the invention is desirably employed in an amount of from 2–50% by weight, based on the total weight of polymerizable material. Preferred proportions, on the same basis, are from 3–25% by weight, most preferably from 4–15%.

The interpolymers of the invention are desirably produced by a single stage solution copolymerization which is more fully described in my prior copending application Serial No. 100,804, filed April 5, 1961, now United States Patent No. 3,163,623, the disclosure of which is hereby incorporated by reference. Thus, organic solvent, aldehyde, an acrylamide and other ethylenically unsaturated material are reacted with one another in the presence of heat and in the presence of a basic catalyst and a free-radical generating polymerization catalyst, and polymerization and alkylolation take place simultaneously. Preferably, the monomers are added to the organic solvent solution which is added slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs. In the presence of alcohol and with continuous removal of water, as by refluxing coupled with azeotropic distillation, etherification takes place at the same time and some of the methylol groups in the alkylolated product may be etherified if desired.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalysts which generate free radicals starting at low temperatures, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalysts which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalysts which become active at still more elevated temperatures of about 100° C. are used in accordance with the invention, these being illustrated by t-butyl perphthalic acid, p-chlorobenzoyl peroxide, t-butyl peracetate, dibenzal diperoxide and di-t-butyl peroxide.

The aldehyde modifying agent is desirably used in an amount of from 0.2–5 equivalents of aldehyde, and preferably in an amount of from 1–2 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Etherification of the aldehyde-modified amide interpolymer is preferred, but not essential. Lower alcohols containing up to 10 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, and by controlling the proportion of water removed, such control being a feature of the invention. When less than 100% etherification is effected, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a saturated aliphathic hydrocarbon radical introduced by the aldehyde modifying agent and R$_1$ is the residue of the etherifying alcohol.

The invention is illustrated in the examples which follow:

EXAMPLE 1

Interpolymer consisting of 10% unsaturated epoxy resin, 45% styrene, 15% acrylamide and 30% ethyl acrylate.

| Charge composition (parts by weight): | Grams |
|---|---|
| Xylol | 200 |
| Methyl isobutyl ketone | 100 |
| n-Butanol | 100 |
| Butyl Cellosolve | 100 |
| Paraformaldehyde | 100 |
| Acrylamide | 150 |
| n-Butanol | 500 |
| Styrene | 450 |
| Ethyl acrylate | 300 |
| Unsaturated epoxy resin A | 100 |
| Triethyl amine | 3 |
| Tertiary dodecyl mercaptan | 24 |
| Azobisbutyronitrile | 5 |
| Di-tertiary-butyl peroxide | 5 |
| Cumene-hydroperoxide | 5 |
| Isopropanol | 90 |

*Procedure of polymerization*

Charge 200 grams xylol, 100 grams methyl isobutyl ketone, 100 grams paraformaldehyde, 100 grams n-butanol and 100 grams butyl Cellosolve into a reactor equipped with an agitator, condenser, thermometer and nitrogen inlet.

The initial charge is heated to reflux temperature (235–240° F.). Then 150 grams acrylamide are dissolved in 500 grams of n-butanol and this solution is premixed with the other polymerizable materials to provide a monomer blend.

To this monomer blend are added 5 grams di-tertiary-butyl peroxide, 5 grams azobisbutyronitrile, 3 grams triethyl amine and 24 grams teritary dodecyl mercaptan. Dodecyl mercaptan is a chain terminating agent.

The above monomer blend, including catalyst and amine are added to the reactor over a 2½ hour period of time, and the mixture is maintained at 245–255° F.

After the monomer addition is finished, the contents of the reactor are kept at reflux temperature (230–240° F.) for 8½ hours for conversion of monomer to interpolymer. No water is removed from the reaction mixture. The solution interpolymer product is thinned with isopropyl alcohol to 49–50% solids and filtered.

The resulting solution of interpolymer has the following physical characteristics:

Solids (percent) _____ 49.1
Viscosity (Gardner-Holdt) _____ V
Color (Gardner-Holdt) _____ 2

EXAMPLE 2

An interpolymer is prepared containing 5% unsaturated epoxy resin using the same procedure as in Example 1

Charge composition (parts by weight): Grams
Xylol _____ 200
Paraformaldehyde _____ 100
Methyl isobutyl ketone _____ 100
n-Butanol _____ 100
Butyl Cellosolve _____ 100
Acrylamide _____ 150
n-Butanol _____ 500
Styrene _____ 440
Ethyl acrylate _____ 360
Unsaturated epoxy resin A _____ 50
Triethyl amine _____ 3
Di-tertiary-butyl peroxide _____ 5
Azobisbutyronitrile _____ 5
Tertiary dodecyl mercaptan _____ 24

The resulting solution of interpolymer has the following physical characteristics:

Solids (percent) _____ 48.1
Viscosity (Gardner-Holdt) _____ U
Color (Gardner-Holdt) _____ 1–2

The resins of Examples 1 and 2 are utilized in enamel formulations containing 28% titanium dioxide and 32% non-volatile resin. The pigmented resin solutions are ground in a pebble mill to obtain a 7½ N.S. grind gauge reading.

The cure characteristics of the enamels are checked using 0.5% by weight of phosphoric acid as catalyst (based on resin solids).

The enamels are drawn on bare steel panels and baked for twenty minutes at 325° F. The following results are obtained:

|  | Example 1 | Example 2 |
|---|---|---|
| Adhesion to metal | Excellent | Excellent. |
| Pencil hardness | 3H+ | 3H. |
| Forward impact | Pass 20 in./lbs. | Pass 20 in./lbs. |
| Flexibility (Conical Mandrel) | Pass ⅛″ | Pass ⅛″. |
| Gloss | Very Good | Very Good. |
| Toluol resistance | Excellent | Excellent. |
| Recoat adhesion | Excellent | Excellent. |

EXAMPLE 3

Using the same procedure as in Example 1, an interpolymer is prepared consisting of 10% unsaturated epoxy resin, 10% acrylamide, 25% styrene, 5% methyl methacrylate, 40% ethyl acrylate, and 10% 2-ethyl hexyl acrylate.

Charge composition (parts by weight): Grams
Mixture of aromatic hydrocarbon solvents (see Note 1 below) _____ 300
n-Butanol _____ 100
Butyl Cellosolve _____ 100
Paraformaldehyde _____ 100
Acrylamide _____ 100
2-ethyl hexyl acrylate _____ 100
n-Butanol _____ 300
Butyl Cellosolve _____ 100
Styrene _____ 250
Methyl methacrylate _____ 50
Ethyl acrylate _____ 400
Unsaturated epoxy resin A _____ 100
Triethyl amine _____ 3
Di-tertiary-butyl peroxide _____ 6
Azobisbutyronitrile _____ 6
Benzoyl peroxide _____ 2
Tertiary dodecyl mercaptan _____ 25

The resulting solution of interpolymer has the following physical characteristics:

Solids (percent) _____ 51.4
Viscosity (Gardner-Holdt) _____ U
Color (Gardner-Holdt) _____ 1–2

The interpolymer of the present example is evaluated as a white enamel containing 28% titanium dioxide and 32% non-volatile resin. The enamel is applied on aluminum using #40 wound wire rod draw downs and the coating is baked for 90 seconds at 475° F. The resulting coating has excellent gloss and appearance. Flexibility is very good and adhesion to metal is outstanding.

NOTE 1.—A mixture of aromatic hydrocarbon solvents having the following typical physical data:

Specific gravity at 60/60° F. _____ 0.8749
Flash, ° F. (Tag closed cup), min. _____ 100
Distillation ASTM (D268):
    Initial boiling point, ° F. _____ 306
    10% _____ 311
    50% _____ 317
    90% _____ 327
    Dry point, ° F. _____ 343
Viscosity, cp., at 25° C. _____ 0.797
K.-B. value (toluol=100) _____ 90
K.-B. value (after 75% is evaporated) _____ 98
Mixed aniline point, ° C. _____ 12.0
Percent aromatics _____ 99.5

As will now be apparent, the inclusion of unsaturated epoxy resin into acrylamide interpolymers produces coatings which cure readily to provide films of increased hardness, flexibility, impact resistance and adhesion to metal. The other desirable characteristics of the interpolymer, such as solvent resistance, intercoat adhesion, and gloss, are not detrimentally affected by the inclusion of the unsaturated epoxy resin.

The invention is defined in the claims which follow.

I claim:

1. A non-gelled interpolymer of: (A) from 5 to 45% by weight of an amide of a monoethylenically unsaturated carboxylic acid; (B) at least one other polymerizable ethylenically unsaturated material copolymerizable with said amide; and (C) from 2 to 50% by weight of unsaturated epoxy polyolefin copolymerizable with said amide and said other unsaturated material, said percentages being based on the total weight of unsaturated polymerizable material and said component (B) constituting the balance of said interpolymer, said interpolymer having amido hydrogen atoms replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxyl alkyl radicals containing up to 10 carbon atoms in the radical.

2. An interpolymer as recited in claim 1 in which said amide is an acrylamide and said component (B) comprises monomer having the $CH_2\!=\!C\!<$ group.

3. An interpolymer as recited in claim 2 in which said amido groups are reacted with formaldehyde.

4. An interpolymer as recited in claim 2 in which said unsaturated epoxy polyolefin is a partially epoxidized polydiene present in an amount of from 3–25% by weight, based on the total weight of unsaturated polymerizable material.

5. A non-gelled interpolymer of: (A) from 5–30% by weight of acrylamide; (B) at least one other polymerizable ethylenically unsaturated material comprising monomer containing the $CH_2\!=\!C\!<$ group copolymerizable with said acrylamide; and (C) from 4–15% by weight of partially epoxidized polybutadiene having an epoxide equivalent weight in the range of from 100–300 and an iodine number of at least 100 copolymerizable with said acrylamide and said other unsaturated material, said percentages being based on the total weight of unsaturated polymerizable material and said component (B) constituting the balance of said interpolymer, said interpolymer having amido hydrogen atoms replaced by the structure —$CH_2OH$ and said percentages being based on the total weight of unsaturated polymerizable material.

6. A heat-hardenable resinous composition comprising an organic solvent solution having dissolved therein a non-gelled interpolymer of: (A) from 5 to 45% by weight of an amide of a monoethylenically unsaturated carboxylic acid; (B) at least one other polymerizable ethylenically unsaturated material copolymerizable with said amide; and (C) unsaturated epoxy polyolefin copolymerizable with said amide and said other unsaturated material, said percentages being based on the total weight of unsaturated polymerizable material and said component (B) constituting the balance of said interpolymer, said interpolymer having amido hydrogen atoms replaced by the structure $$-\overset{R}{\underset{|}{C}}HOR_1$$

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical.

7. An article having a metal surface to which is adhered a heat-hardened coating of the resinous composition of claim 6.

References Cited by the Examiner
UNITED STATES PATENTS

| | | | |
|---|---|---|---|
| 2,870,117 | 1/1959 | Vogel et al. | 260—72 |
| 3,037,963 | 6/1962 | Christenson | 260—72 |
| 3,041,352 | 6/1962 | Newey | 260—47 |
| 3,060,144 | 10/1962 | Gaylord | 260—45.2 |

LEON J. BERCOVITZ, *Primary Examiner.*

DONALD E. CZAJA, *Examiner.*